United States Patent [19]
Schmid et al.

[11] Patent Number: 5,609,382
[45] Date of Patent: Mar. 11, 1997

[54] MOTOR VEHICLE CENTRAL CONSOLE

[75] Inventors: Peter Schmid, Schorndorf; Siegfried Schreiber, Laufen a.N.; Helmut Grantz, Sindelfingen, all of Germany

[73] Assignee: Mercedes-Benz AG, Germany

[21] Appl. No.: 537,437

[22] Filed: Oct. 2, 1995

[30] Foreign Application Priority Data

Oct. 12, 1994 [DE] Germany .................. 44 36 420.2

[51] Int. Cl.$^6$ .................................................. B60R 7/04
[52] U.S. Cl. .................... 296/37.8; 224/539; 224/929
[58] Field of Search ................... 296/37.8, 37.7, 296/37.14; 224/539, 929

[56] References Cited

U.S. PATENT DOCUMENTS

| | | | |
|---|---|---|---|
| 3,799,483 | 3/1974 | Chiappinelli | 296/37.8 |
| 4,453,759 | 6/1984 | Kathiria . | |
| 4,940,275 | 7/1990 | Miki et al. | 296/37.8 |
| 5,085,481 | 2/1992 | Fluharty et al. . | |
| 5,088,571 | 2/1992 | Burry et al. . | |
| 5,106,143 | 4/1992 | Soeters | 296/37.8 |
| 5,282,556 | 2/1994 | Bossert | 296/37.8 X |
| 5,397,160 | 3/1995 | Landry | 296/37.8 |

FOREIGN PATENT DOCUMENTS

| | | |
|---|---|---|
| 0047858A1 | 12/1982 | European Pat. Off. . |
| 0083701A2 | 7/1983 | European Pat. Off. . |
| 3708355A1 | 2/1987 | Germany . |
| 90110358 | 10/1990 | Germany . |
| 4215136A1 | 11/1993 | Germany . |
| 004215136 | 11/1993 | Germany ............. 296/37.8 |
| 4-63739 | 2/1992 | Japan . |
| 404063739 | 2/1992 | Japan ............. 296/37.8 |
| 2162134 | 7/1984 | United Kingdom . |

*Primary Examiner*—Joseph D. Pape
*Attorney, Agent, or Firm*—Evenson, McKeown, Edwards & Lenahan, P.L.L.C.

[57] ABSTRACT

A central console for a motor vehicle, in particular for a passenger car, has prefabricated connections. At least one add-on part which is provided with optional additional devices and/or operating elements can be fitted on the prefabricated connections.

9 Claims, 2 Drawing Sheets

MOTOR VEHICLE CENTRAL CONSOLE

BACKGROUND AND SUMMARY OF THE INVENTION

The present invention relates to a central console for a motor vehicle, in particular for a passenger car, which, starting from an instrument panel, extends between the front seats into the vehicle interior and is provided with standard operating elements and, if-appropriate, with optional additional devices and/or operating elements.

Central consoles are shown, for example, in EP 0 047 858 Al, GB 21 62 134 A and U.S. Pat. No. 4,453,759. They contain at least one standard operating element, for example a gear-shift lever or selector lever. It is, moreover, known to arrange operating elements for further standard devices in the central console, for example for a mirror adjustment, for a gear box interlock, for an access-authorization system or connections for additional loads.

Furthermore, the known central console is connected to control units. If the customer wishes the vehicle to be provided with optional fittings, it is also known to arrange said optional devices and/or their operating elements likewise in the central console. The large number of different variants arising due to wishes for optional fittings results in substantial logistical costs in order to provide the different variants of central consoles during production.

It is also known to arrange, between the front seats of a motor vehicle, an additional console only for a specific purpose, in particular for receiving a telephone (i.e., telephone console) as seen in DE 37 08 355 Al.

An object of the present invention is to reduce the costs caused by a large number of different variants as regards the central console.

This object has been achieved in accordance with the present invention by providing prefabricated connections on the central console. At least one add-on part can be fitted on these connections and provided with the optional additional devices and/or operating elements.

This new configuration permits use of a central console as a basic part which is varied by one or more add-on parts in accordance with the customer's wishes for optional fittings. The prefabricated connections for the central console serving as a basic part constitute justifiable preliminary measures which, although they increase the outlay to some extent, are justifiable in terms of the possible variations and the costs of the optional fittings, which are then only relatively low.

In one embodiment of the invention, the prefabricated connections contain mechanical securing apparatus and/or electrical/electronic plug-in connections. Starting from the basic version of the central console as a basic element, individualized central consoles can thereby be provided in each case to correspond to the respective optional fittings. The electrical/electronic plug-in connections should at least contain power-supply connections, a connection to the CAN bus and connections for entertainment electronics.

In a further embodiment of the present invention, one add-part is configured as an add-on console which partially covers over the central console. With this arrangement, a further configuration of the present invention allows the add-on console to be provided with an electronics printed circuit board which contains operating elements or the like, projecting out of the add-on console, and to be provided with plug-in connections which can be connected to plug-in connections provided on the central console. The electronics printed circuit board can also contain the additional intelligence and storage capacity which is necessary for the optional fittings, which is connected to the standard operating system via the plug-in connection and which can then communicate with the operating system.

In yet a further embodiment of the present invention, one add-on part is configured as a housing which contains one or more additional devices and/or operating elements. The housing is suitable, in particular, for receiving additional devices which are not directly dependent on the operating system of the vehicle, for example cassette players or CD players, CD changers, second radio with headset connections for rearseat occupants, compact video systems for the rear-seat occupants, telephone, heat-retaining box, cool box, drinks holder, illumination for central shelf or the like.

Other objects, advantages and novel features of the present invention will become apparent from the following detailed description of the invention when considered in conjunction with the accompanying drawings.

DETAILED DESCRIPTION OF THE DRAWINGS

Figure 1:
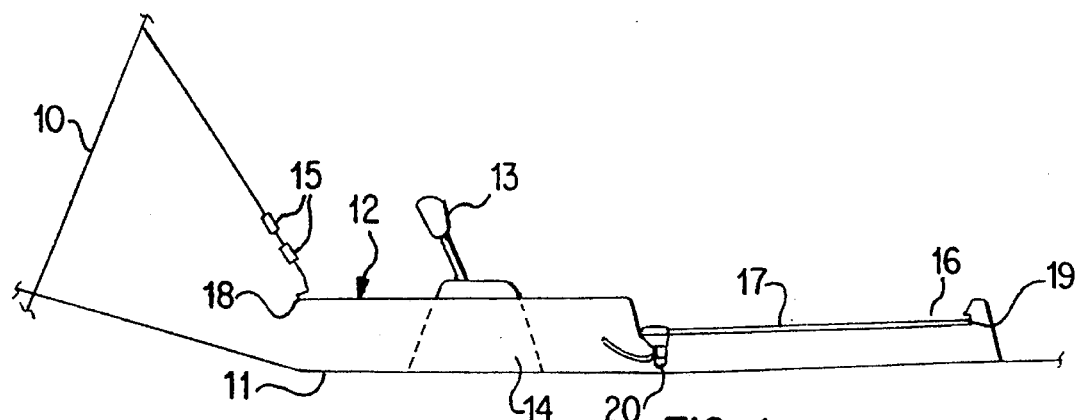
FIG. 1 is a longitudinal sectional schematic view through a central console which serves as basic part for a series-produced vehicle without optional fittings.

In the embodiments according to FIGS. 1 to 5, a central console 12 is arranged between a vehicle splash wall 10 terminating the vehicle interior to the front, beneath an instrument panel (not shown) and above a tunnel 11 running in the central longitudinal plane of the vehicle. The central console 12 extends in the center of the vehicle, starting from the region beneath the instrument panel, into the region between the front seats (not shown) of the passenger car. The central console 12 which is, for example, a shell-shaped plastic molding, contains operating elements necessary for operating the vehicle. These elements include, for example, the gear-shift lever or-a selector lever 13 of a gear-shift unit 14. The central console 12 further contains function switches 15, for example for actuating electric window lifters, and a shelf 16 which is lined with a carpet 17. The central console 12 is a basic part which belongs to the basic fittings or standard fittings of the vehicle concerned.

In order to be able to use the central console 12 in an unmodified state and, nevertheless, to utilize it to receive optional additional devices and/or optional additional operating elements, the central console 12 is provided with prefabricated connections 18, 19, 20, which are shown schematically in the drawings.

Some of the prefabricated connections 18, 19, 20 are mechanical securing apparatus and some are electrical plug-in connections. The electrical plug-in connections are arranged, seen in FIGS. 1 to 4, in the region of the sunken shelf 16, with the result that they are covered by the carpet 17 when not in use, i.e. when the vehicle is supplied only with the basic fittings and not with any optional fittings. For example a vehicle-independent unit such as a vacuum cleaner, compressor, fax machine, shaver, additional lights, hair-drier, toaster, PC etc. can be connected to the plug-in connections.

Figure 2:
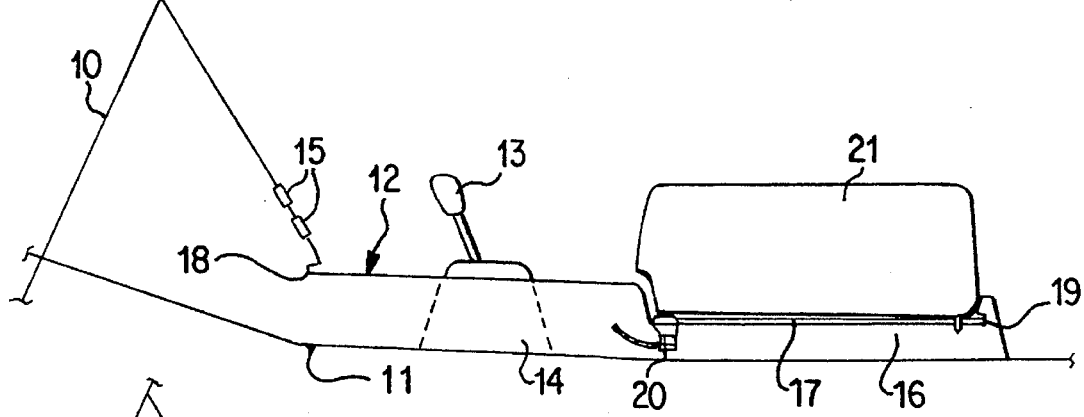
FIG. 2 is a sectional view through the central console according to FIG. 1 and provided with a housing containing additional devices and/or operating elements for optional fittings.

In the embodiment of FIG. 2, a housing 21 with additional devices, a so-called individual box, is fitted On the central console 12. The individual box 21 is arranged in the region of the shelf 16 and is connected mechanically and electrically in this region to the central console 12.

Figure 3:
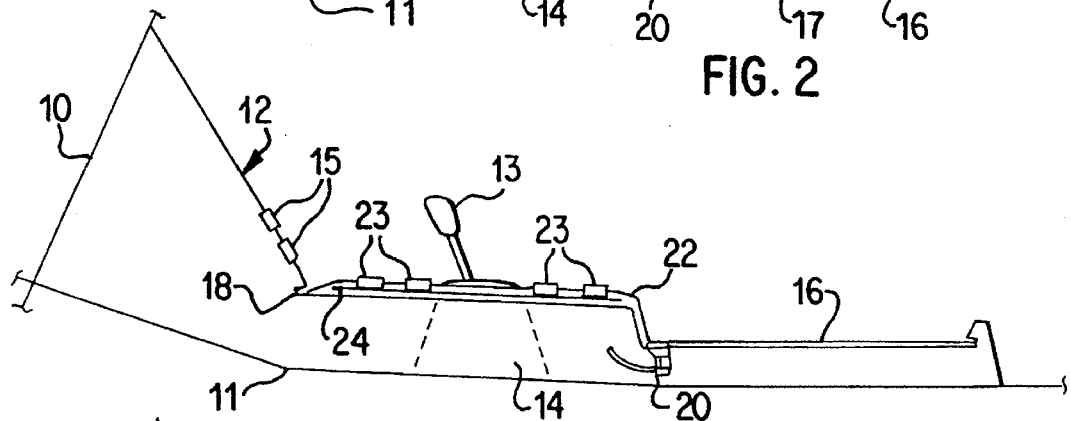
FIG. 3 is a sectional view through a central console corresponding to FIG. 1, and provided with an add-on console.

In the embodiment of FIG. 3, the central console 12 is provided with an add-on console 22 which, for example, is likewise a plastic molding. The add-on console 22 covers over a part of the central console 12 including the region of the shelf 16. It is plugged into the prefabricated connections 18, 19 by way of its ends. In the region of the gear unit 14, its underside contains an electronics printed circuit board 24 from which operating elements 23 project outwardly. The operating element 23 are located in the region of the gear-shift lever or selector lever 13. The electronics printed circuit board 24 is provided with electrical plug-in connections with which contact can be made in particular in the region of the shelf 16.

Figure 4:
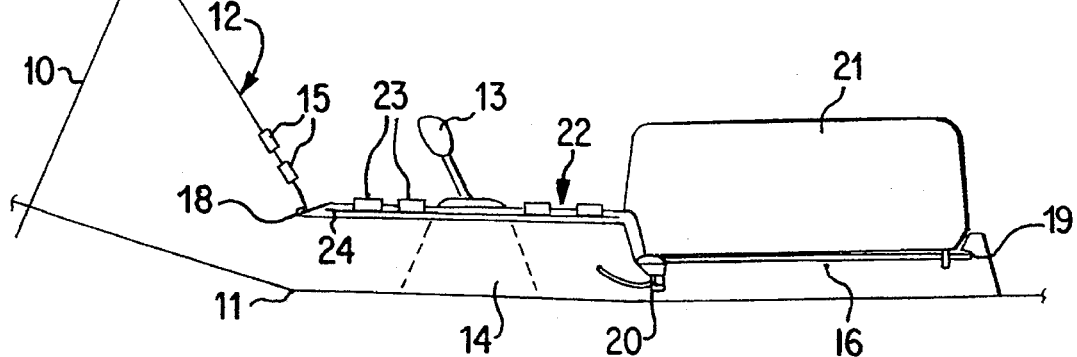
FIG. 4 is a sectional view through the central console according to FIG. 1, and provided with an add-on console and a housing which contains additional devices.

As shown in FIG. 4, the central console can be easily equipped both with the individual box 21 and with the add-on console 22.

Figure 5:
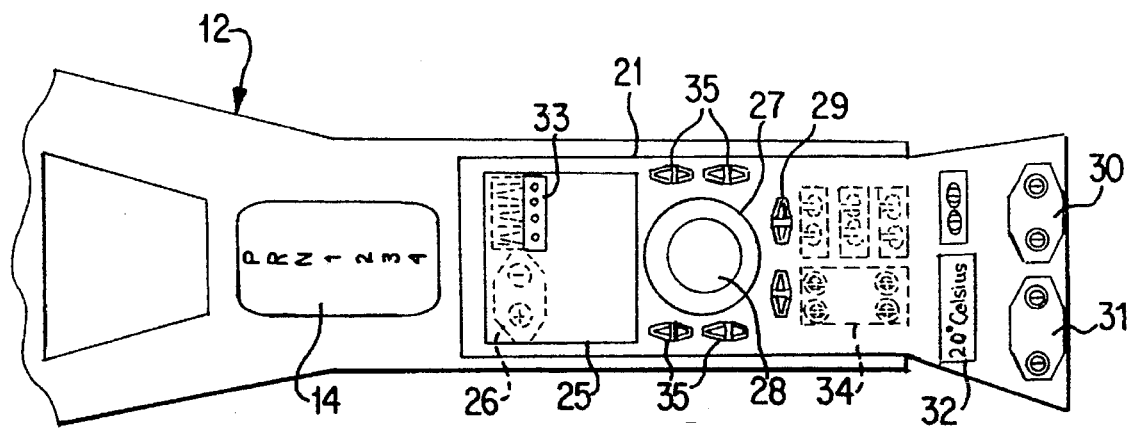
FIG. 5 is a plan view of a central console with an add-on part configured as a housing.

The housing 21 or the individual box shown in FIG. 5 has in the region oriented towards the gear-shift unit 14, a recess 25 which can serve as a shelf. However, an ashtray with a cigar lighter may also be inserted into the recess 25. The lighter is then connected to a power-supply connection 26 of the central console 12 via a two-pole plug-in connection. The housing 21 further contains a receiver 27 for a cup 28, the receiver being provided with a heater. The heater can be switched on and off via rocker switches 29, connected via a plug-in connection to a power supply of the central console 12. In the end region, the housing is provided with securing apparatus 30 with two contacts for a shaver and with a securing means 31 with two contacts for a torch or the like. Furthermore, the individual box also has an interior-temperature-sensing device with a temperature display 32. In the region of the receiver means 25 a further plug-in connection 33 is provided, for example for the connection of one or more stereo headsets.

It is readily possible also to equip the individual box with operating elements via which additional devices of the vehicle can be actuated, for example a seat-heater means. For this purpose, a power supply 34 for the driver's seat and the passenger seat are provided in the form of plug-in connections. These can be actuated by rocker switches 35 which are provided in the region adjacent to the securing apparatus 27 for the cup 28.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A central console for a motor vehicle which extends from an instrument panel at a forward portion of a passenger compartment into the vehicle interior between the front seats and has operating elements constituting a console with a finished appearance and prefabricated mechanical and electrical connections and is configured to receive during manufacture at least one add-on part comprising optional additional devices and operating elements with means for being operatively associated with the mechanical and electrical connections of said console so as to provide a variety of console configurations having different ones of the at least one add-on part.

2. The central console according to claim 1, wherein the connections include at least one of mechanical securing apparatus and electrical/electronic plug-in connections.

3. The central console according to claim 1, wherein one add-on part is an add-on console partially covering the central console.

4. The central console according to claim 3, wherein the connections include at least one of mechanical securing apparatus and electrical/electronic plug-in connections.

5. The central console according to claim 3, wherein the add-on console is provided with an electronics printed circuit board containing operating elements projecting out of the add-on console, and with plug-in connections connectable to plug-in connections on the central console.

6. The central console according to claim 1, wherein the at least one add-on part includes one add-on part configured as a housing containing at least one additional device and operating element.

7. The central console according to claim 6, wherein the connections include at least one of mechanical securing apparatus and electrical/electronic plug-in connections.

8. The central console according to claim 7, wherein one add-on part is an add-on console partially covering the central console.

9. The central console according to claim 8, wherein the add-on console is provided with an electronics printed circuit board containing operating elements projecting out of the add-on console, and with plug-in connections connectable to plug-in connections on the central console.

* * * * *